(12) United States Patent
Huber et al.

(10) Patent No.: US 8,496,418 B2
(45) Date of Patent: Jul. 30, 2013

(54) FASTENING DEVICE FOR AT LEAST PARTIALLY SECURING A FIRST AND A SECOND FREIGHT ITEM

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 93 days.

(21) Appl. No.: 13/166,529

(22) Filed: Jun. 22, 2011

(65) Prior Publication Data

US 2012/0027534 A1    Feb. 2, 2012

(30) Foreign Application Priority Data

Jun. 23, 2010   (DE) .......................... 10 2010 017 535

(51) Int. Cl.
*B60P 7/06*       (2006.01)
*B60P 7/08*       (2006.01)
*B64C 1/20*       (2006.01)

(52) U.S. Cl.
USPC .......... 410/69; 410/79; 244/137.1; 244/118.1

(58) Field of Classification Search
USPC ........... 410/69, 77, 78, 79, 80, 92; 244/118.1, 244/137.1; 414/536; 248/500, 503
See application file for complete search history.

(56) References Cited

U.S. PATENT DOCUMENTS 3,906,870 A * 9/1975 Alberti ............................ 410/79
3,927,622 A * 12/1975 Voigt .............................. 410/79
3,933,101 A   1/1976 Blas (Continued)

FOREIGN PATENT DOCUMENTS

DE       2340315 A1    2/1975
DE       3107745 A1    9/1982
DE       42 24 840     8/1993
EP       0434954 A2    7/1991

OTHER PUBLICATIONS

European Search Report in EPO Application 11168012.0, Oct. 19, 2012.

(Continued)

*Primary Examiner* — Glenn Dayoan
*Assistant Examiner* — Sunsurraye Westbrook
(74) *Attorney, Agent, or Firm* — Barnes & Thornburg LLP

(57) ABSTRACT

Fastening elements are known in which locking elements can be swivelled out of a non-operative position and into a fixing position. Usually, each of these locking elements has a locking lug. The known fastening devices are mostly very complex in their structure.
The some embodiments of present application propose the provision of a fastening device for at least partially securing a first and a second freight item, which fastening device comprises a frame and comprises a locking claw having a first locking lug and a second locking lug. The locking lugs in this case are aligned along a longitudinal direction of the fastening device, for the purpose of encompassing and holding partial portions of the freight items. The locking claws are pivotally fastened to the frame of the fastening device in such a way that the locking claw can be swivelled out of a fixing position, for securing the freight items, into a non-operative position. The locking claw can comprise at least one ramp portion and be realized in such a way that the locking claw can be swivelled out of the fixing position and into the non-operative position by a freight item approaching in the transverse direction.
This appliance is not only easy to operate, but can achieve considerable savings in weight in the configuration of the freight deck.

14 Claims, 6 Drawing Sheets

U.S. PATENT DOCUMENTS

| | | | |
|---|---|---|---|
| 4,077,590 A * | 3/1978 | Shorey | 410/77 |
| 4,121,789 A * | 10/1978 | Lent et al. | 410/77 |
| 4,331,412 A * | 5/1982 | Graf | 410/69 |
| 4,457,649 A | 7/1984 | Vogg et al. | |
| 5,011,348 A | 4/1991 | Jensen et al. | |
| 5,112,173 A * | 5/1992 | Eilenstein et al. | 410/79 |
| 5,433,564 A * | 7/1995 | Sundseth | 410/77 |
| 5,564,654 A * | 10/1996 | Nordstrom | 244/118.1 |
| 6,193,453 B1 * | 2/2001 | Kernkamp | 410/79 |
| 6,270,300 B1 * | 8/2001 | Huber et al. | 410/69 |
| 6,425,717 B1 * | 7/2002 | Saggio et al. | 410/79 |
| 6,485,238 B2 * | 11/2002 | Segura | 410/69 |
| 7,429,157 B2 * | 9/2008 | Schulze et al. | 410/69 |

OTHER PUBLICATIONS

German Examination Report for DE 10 2010 017 835.8 dated Mar. 14, 2011.

* cited by examiner

FASTENING DEVICE FOR AT LEAST PARTIALLY SECURING A FIRST AND A SECOND FREIGHT ITEM

CROSS-REFERENCE TO RELATED APPLICATIONS

This application claims priority to foreign German Patent Application No. 10 2010 017 535.8, filed Jun. 23, 2010, priority is claimed to this application and the disclosure of which is incorporated by reference in its entirety.

FIELD OF THE INVENTION

The invention relates to a fastening device for at least partially securing a first and a second freight item.

BACKGROUND OF THE INVENTION

In the cargo hold of an aircraft, particularly of a large-capacity aircraft, freight items (e.g. containers or pallets) are usually moved by means of rolling conveyors. Fastening rails fastened to the cargo deck of the aircraft serve to receive functional elements. Such functional elements can be fastening devices for at least partially securing freight items. The fastening devices can also be integrated directly into the cargo deck.

The fastening devices must be robust and suitable for transferring large loads into the aircraft deck. Furthermore, such fastening devices should be very easy to operate, since, frequently, the loading and unloading operation is performed by persons who have not received any instruction in respect of the specific loading appliance. In addition, both the loading and unloading are performed under high pressure of time, which can additionally result in incorrect operation.

A defective freight loading system—whether due to incorrect operation or due to natural wear—can result in considerable costs, since the maintenance of large-capacity aircraft is very expensive. Each minute that a large-capacity aircraft spends on the ground is costing the operator money.

Furthermore, it must be taken into account that, in the transport of cargo, the weight per aircraft is crucial. For this reason, attempts are made to minimize the tare weight of the aircraft.

Known from U.S. Pat. No. 5,011,348 is a fastening device that can be installed in the centre of a cargo hold, along the longitudinal direction of the aircraft, and serves there as a guide ("centre guide"). The fastening device has two locking claws, fastened to which, respectively, there is a locking lug, which locking lugs face in opposing directions. The locking lugs are realized to encompass partial portions of the freight items, to secure the latter in the transverse direction and fix them in place in such a way that the freight items cannot be lifted out of the guide. The locking claws are pivotally mounted on a frame, such that they can be folded away in the longitudinal direction when a freight item travels over them. The mechanism associated therewith is very elaborate. The overall structure of the fastening device from U.S. Pat. No. 5,011,348 is very large and requires sufficient space. Furthermore, this fastening device is heavy and of such a complicated structure that, in the harsh environment in which it is used, numerous elements can fall out.

Accordingly it is desired to provide a fastening device the addresses some of these shortcomings.

SUMMARY OF THE INVENTION

In particular, the object is achieved by a fastening device for at least partially securing a first and a second freight item, which may include a frame, a locking claw, having a first locking lug and a second locking lug that, for the purpose of encompassing and holding partial portions of the freight items, are aligned along a longitudinal axis of the fastening device, the locking claw being pivotally fastened to the frame in such a way that the locking claw can be swivelled out of a fixing position, for securing the freight items, into a non-operative position, the locking claw comprising at least one ramp portion and being realized in such a way that the locking claw can be swivelled out of the fixing position and into the non-operative position by a freight item approaching in the transverse direction.

A substantial advantage of the present invention consists in that the fastening device can be realized in a very compact manner. The locking claw comprises the two locking lugs, and enables both to be moved back and forth simultaneously between the non-operative position and the fixing position. The ramp portion enables the locking claw to be lowered automatically, such that it can be brought easily into the non-operative position. As a result, damage to the fastening device by improperly guided freight items is precluded. At the same time, the locking claw is very stable, and can efficiently transfer occurring forces into the freight deck.

Preferably, the transverse direction is defined such that it runs perpendicularly in relation to the longitudinal direction of the fastening device. For swivelling of the locking claw between the non-operative position and the fixing position, however, it is not necessary for a corresponding freight item to travel onto the locking claw exactly from the transverse direction. Rather, a substantially lateral approach is sufficient to lower the locking claw.

Preferably, the locking lugs face in opposing direction.

Preferably, the fastening device is inserted as a lateral guide in the freight deck. The locking lugs disposed on the locking claw can differ in principle. They can be rotary lugs, rigid lugs or double lugs.

The locking claw can comprise a first locking element and a second locking element, the first locking element being pivotally connected to the second locking element in such a way that the second locking element, in the fixing position, can be brought into a blocking position in which the second locking element supports the locking claw relative to the frame. Thus, preferably, the locking claw is realized at least in two parts, being divided into a first and a second locking element. The two locking elements are pivotally connected to each other, such that they can be swivelled against each other. Preferably, the first locking element comprises the first locking lug, and the second locking element comprises the second locking lug. The second locking element can furthermore perform a support function, such that the locking claw is supported, on the one hand, via the pivoted connection and, on the other hand, via the bearing contact of the second locking element relative to the frame. The second locking element can serve as a support for transferring forces into the frame. The pivoted connection of the locking elements can be used to move the second locking element into a release position, in which the locking claw can be lowered into the non-operative position.

The fastening device can comprise at least one spring element, which biases the locking claw into the fixing position and/or biases the second locking into the blocking position relative to the first locking element. A spring element that holds the locking claw in the fixing position can thus be provided. A freight item can therefore travel laterally over the locking claw, the locking claw moving back into the fixing position as soon as the freight item no longer exerts any force. It is not necessary for the locking claw to be brought manually into the fixing position.

In addition to or instead of this, a spring element can be provided that biases the second locking element into the blocking position relative to the first locking element. In the fixing position, therefore, the second locking element is always supported on the frame, and enables the locking claw to transfer into the frame forces from the directions provided for this purpose. The blocking position is terminated only upon a manual actuation or upon an actuation by a freight item approaching the locking claw laterally.

The second locking element can comprise at least one latch, which is disposed in such a way that the latch, in the non-operative position, can be brought into engagement with a portion of the frame in order to hold the locking claw in the non-operative position. There are applications in which it is advantageous if the locking claw remains in its non-operative position. An example is the loading of the freight deck by means of a vehicle. A latch that enables the locking claw to be fixed in the non-operative position can be provided for this purpose. Preferably, this latching mechanism is disposed in such a way that latching does not occur automatically when a freight item travels over the locking claw. Rather, it is necessary for additional force to be applied, such that the locking claw is fixed in the non-operative position. For example, automatic latching can occur when the locking claw is not only lowered to such an extent that the freight item can travel over it, but is brought into a lower position, for example a latching position.

For the purpose of supporting the locking claw, the second locking element can comprise at least one support portion that is convex in the longitudinal direction. The frame can comprise at least one concave receiver, in particular having an extension, in order to receive the support portion and to block the locking claw in the fixing position. The rounded realization of the support portion enables the locking element to be swivelled, for example out of the blocking position, such that binding cannot occur here. In addition, the concave shape of the frame in which the convex support portion engages increases the contact surface between the frame and the second locking element, such that greater forces, in particular along the second locking element, can be reliably transferred in.

The at least one ramp portion can be realized and disposed in such a way that the approaching freight item induces a rotational motion about a rotation axle that connects the first locking element and the second locking element. Preferably, the pivoted connection between the locking claw and the frame is realized by means of a pivot joint, the swivelling between the fixing position and the non-operative position being effected by a rotational motion about the associated rotation axle, or main axle. The at least one ramp portion can be disposed in an offset manner relative to the main axle, such that an approaching freight item moving onto the ramp portion induces a rotational motion about the main axle.

The frame can comprise at least one first rail and one second rail, in which rails the locking claws are mounted in a rotationally movable manner, the rails comprising a guide and comprising at least one latching device in which the locking claw, in particular a main axle thereof, is disposed so as to be displaceable in the longitudinal direction. The locking claw can thus be displaced within the frame, for example between a first and a second position. In each of these positions, the locking claw can be used to encompass and hold a partial portion of the freight items, and thereby secure the freight items. For this purpose, in one embodiment, the main axle can be moved back and forth within the rails of the frame and can be latched at certain, predetermined positions. The fastening device can thus be used in the freight deck to equip the latter for differing freight items. For example, through the displacing of the locking claw, the fastening device can be adapted to the width of the freight items. The same locking claw can thus be used at differing positions, whereas, instead, in the case of conventional devices, a plurality of fastening devices were provided. This can result in considerable savings in weight.

The main axle can comprise a sleeve having at least one pin, which is disposed so as to be movable in the latter and which, for the purpose of fixing the locking claw, engages in a recess disposed on the frame. It is possible for the above-mentioned latching device to be realized such that the latter is applied next to the main axle. Preferably, however, a part of the main axle itself latches into recesses provided for this purpose. For example, two pins that are mounted within a sleeve of the main axle can engage in the frame, on either side of the main axle, and thus fix the main axle in position. A rotation of the locking claw about the main axle is not restricted as a result of this.

The second locking element, in cross-section, can have a substantially trapezoidal shape, in order to support the locking claw on the frame. Preferably, support on the first and the second rail is effected by means of a first and a second support portion, which support portion also comprises the ramp portion or portions. The trapezoidal shape allows a suitable transfer of force. The second locking element can be realized as a type of frame or collar, which at least partially encompasses the first locking element. The locking claw can thus be of a substantially more compact design.

The locking claw can comprise a first stop, which, in the fixing position, is realized so as to correspond to a second stop on the frame, in such a way that a lifting force acting upon the locking claw in the fixing position can be transferred into the frame. For example, the main axle guided in the rails can be designed in such a way that swivelling between the non-operative position and the fixing position is possible. As soon as the fixing position is attained, however, the first stop bears on the second stop in such a way that a further rotary motion about the main axle is no longer possible. Forces acting upon the locking claw can thus be transferred into the frame in an efficient manner.

Further preferred exemplary embodiments are given by the dependent claims.

BRIEF DESCRIPTION OF THE DRAWINGS

The invention is described more fully in the following by means of a plurality of exemplary embodiments, which are explained more fully with reference to a plurality of illustrations, wherein.

DETAILED DESCRIPTION

In the following description, parts that are the same and have the same function are denoted by the same references.

Figure 1:
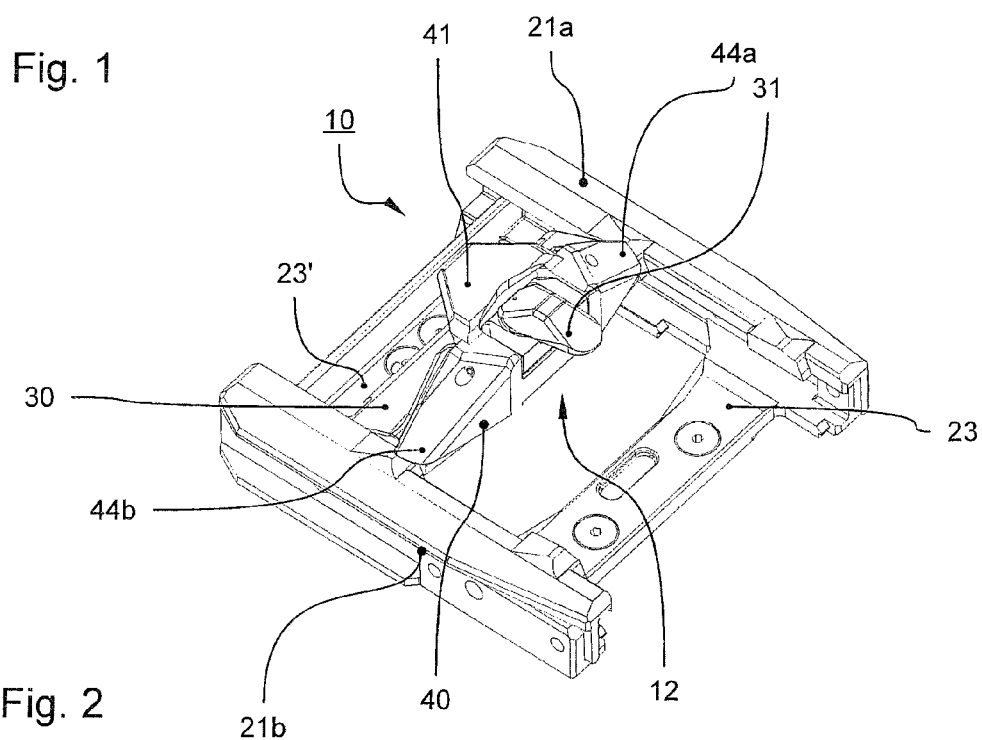
FIG. 1 shows a perspective view of a fastening device having a locking claw.
Figure 2:
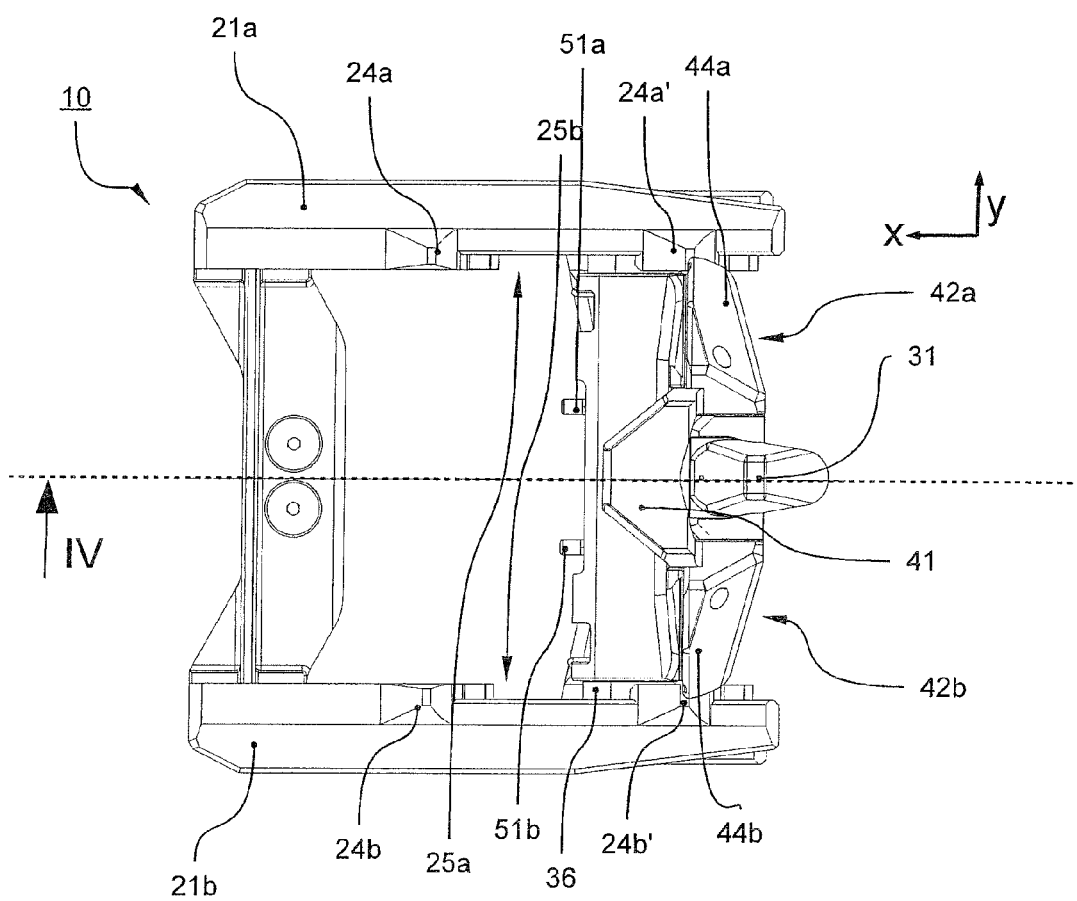
FIG. 2 shows a plan view of the fastening device from FIG. 1.

FIG. 1 illustrates the general structure of a fastening device 10 according to the invention, which comprises a frame 20 and a locking claw 12 mounted therein in a rotationally movable manner. The frame 20 is divided into a first rail 21a and a second rail 21b, which are disposed substantially parallelwise in relation to one another and define a longitudinal direction X. The two rails 21a, 21b are connected to one another by two struts 23, 23'. These struts 23, 23' comprise fastening devices for connecting the frame 20 to the freight deck. The locking claw 12 has a first locking element 30 and a second locking element 40. The first locking element 30 and the second locking element 40 are connected to one another in a rotationally movable manner. The locking claw 12 has a first locking lug 31 and a second locking lug 41, the first locking lug 31 being fastened, in the exemplary embodiment described, to the first locking element 30, and the second locking lug 41 being fastened to the second locking element 40. The locking lugs 31, 41 each face in opposing directions, and are aligned along the longitudinal direction X. The second locking element 40 constitutes a type of frame or collar, which encompasses the first locking element 30. This frame is composed of the second locking lug 41, a first ramp portion 44a and a second ramp portion 44b. The ramp portions 44a, 44b run substantially in the transverse direction Y, transversely in relation to the longitudinal direction X of the fastening device 10 and, as shown in FIG. 2, are inclined relative to a plane spanned by the rails 21a, 21b in such a way that a freight item approaching the locking claw 12 laterally induces a rotational motion of the locking claw 12 within the frame 20. The ramp portions can have an angle of inclination, relative to the spanned plane, of less than 60°, in particular less than 50°, in particular less than 45°.

The pivoted connection between the locking claw 12, more specifically the first locking element 30, and the frame 20 is realized by a pivot joint having a main axle 36. The main axle 36 is indicated schematically in FIG. 2.

The fastening device 10 according to the invention enables the locking claw to be swivelled between the fixing position and the non-operative position. In the fixing position, the fastening device 10 can hold and fix freight items that are moved onto the locking claw from behind or from the front (in the longitudinal direction). In the non-operative position, the locking claw 12 is sunk into the frame 20, such that travel over the fastening device 10 is possible.

Figure 7:
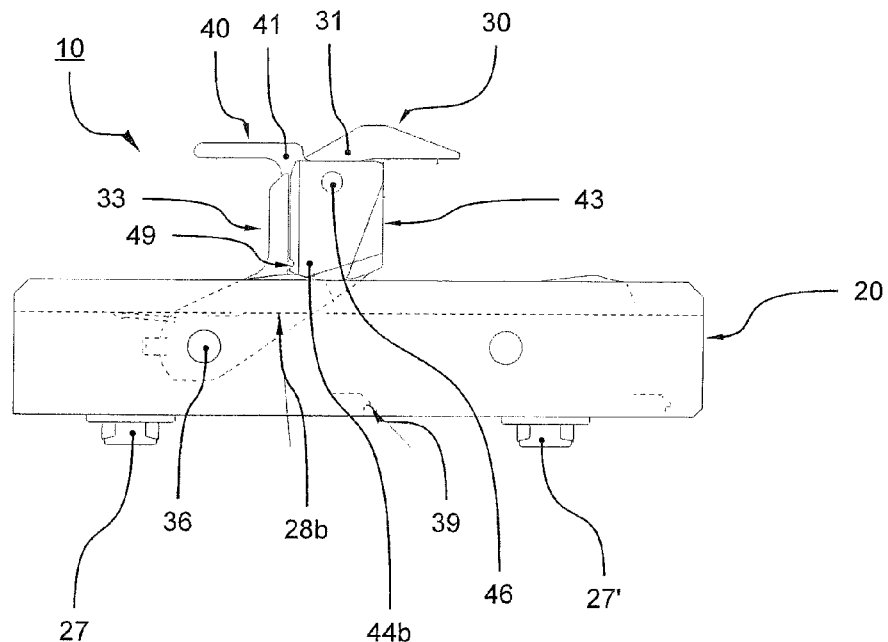
FIG. 7 shows a schematic side view of the fastening device from FIG. 1, wherein the locking claw is in the fixing position.

The operation of swivelling between the fixing position and the non-operative position is explained more fully in the following with reference to FIGS. 7 to 10. FIG. 7 shows the locking claw 12 in the fixing position, wherein the locking lugs 31, 41 extend substantially parallelwise in relation to the longitudinal direction X. The locking claw 12, in combination with the frame 20, constitutes a first and a second U profile, respectively, for receiving partial portions of the freight items. The first U profile is constituted by the first locking lug 31, a stop 43 present on the second locking element 40, and the rails 21a and 21b. A second U profile, which is open in the opposite direction, comprises the second locking lug 41, a stop 33 disposed on the first locking element 30, and the rails 21a, 21b. In side view (e.g. FIG. 7, the locking lugs 31, 41, together with portions of the locking elements 30, 40, realize a T profile.

As can be seen from FIG. 7, the first locking element 30 is connected to the second locking element 40 via a rotary axle 46. In FIG. 7, the second locking element 40 element is in a blocking position relative to the first locking element 30, convex support portions of the ramp portions 44a, 44b bearing flatly on the frame 20, in particular on extensions 24a, 24b (cf. FIG. 2) provided thereon. In this fixing position, portions of the locking claw 12, namely the realized T profile, are displaced relative to the main axle 36 in the longitudinal direction in such a way that the ramp portions 44a, 44b bearing on the frame 20 constitute a blocking member, such that a rotation in the clockwise direction (starting from the side view of FIG. 7) is not possible. To that extent, forces occurring at the first stop 33 are transferred directly into the frame 20 by the ramp portions 44a, 44b.

Figure 11:
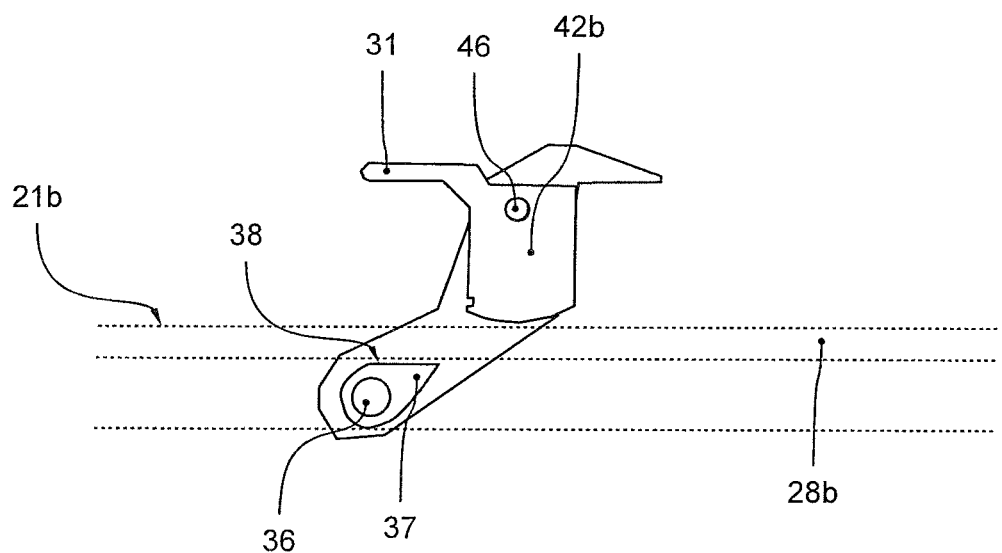
FIG. 11 shows a schematic view of the locking claw of the fastening device from FIG. 1.

A counter-clockwise rotation (starting from the side view of FIG. 7) is prevented by the upper guides 28a, 28b of the rails 21a, 21b and the particular design of the main axle 36. Thus, as illustrated in FIG. 11, the first locking element 30 has, on each side, immediately adjacent to the rails 21a, 21b, a main axle extension 37 having a main axle stop 38, which, in the fixing position, runs substantially parallel to the upper guides 38a, 38b, in order to prevent the said counter-clockwise rotation. The main axle stop 38 in this case is realized in such a way that a clockwise rotation is not prevented.

Figure 8:
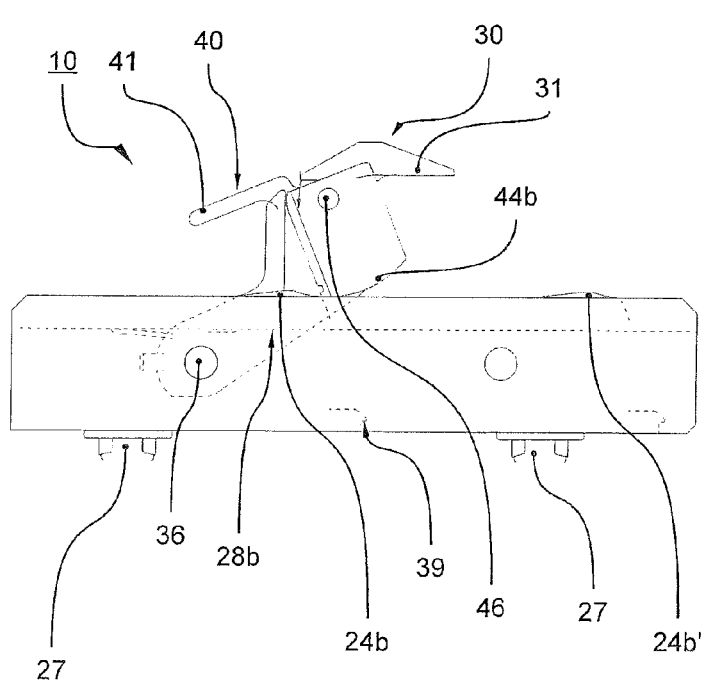
FIG. 8 shows a schematic side view of the fastening device from FIG. 1, wherein the locking claw is at least partially tilted because of an approaching freight item.

If a freight item then approaches the locking claw 12 laterally, owing to the ramp portions 44a, 44b this results in a rotational motion of the second locking element 40 relative to the first locking element 30. The second locking lug 41 tilts downwards, the ramp portions 44a, 44b being raised. This is represented in FIG. 8. Owing to the tilting (counter-clockwise rotation) of the second locking element 40, the convex support portions move outwards (in relation to the main axle 36) in such a way that these support portions no longer bear on the extensions 24a, 24b. The frame 20 includes frame recesses 25a, 25b (FIG. 2), which are realized in such a way that the ramp portions 44a, 44b fit between the rails 21a, 21b. While the spacing of the extensions 24a, 24b (but also 24a', 24b') with bearing contact surfaces disposed correspondingly thereon is selected such that this spacing is less than the maximum width of the second locking element 41, the spacing in the case of the frame recesses 25a, 25b is significantly greater, such that the locking claw 12, together with the ramp portions 44a, 44b can be received by the frame 20.

Figure 9:
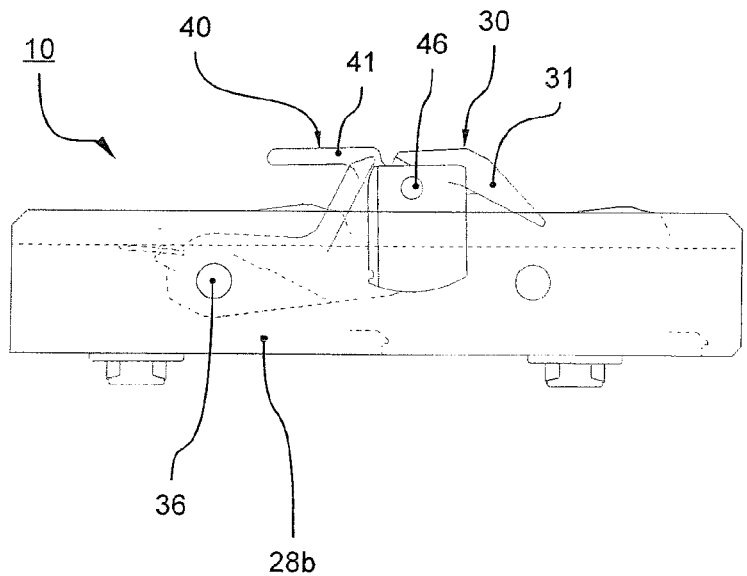
FIG. 9 shows a side view of the fastening device from FIG. 1, wherein the locking claw is partially lowered.
Figure 10:
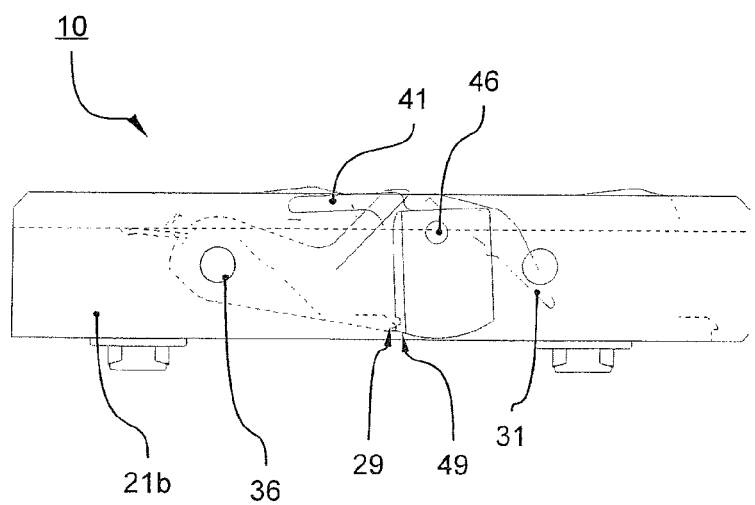
FIG. 10 shows a side view of the fastening device from FIG. 1, wherein the locking claw is in the non-operative position.

As shown in FIG. 9, the locking claw 12 can thus slide between the rails 21a, 21b and assume a non-operative position (cf. FIG. 10). In a preferred exemplary embodiment, the first locking element 30 has spring elements, which bias the locking claw into the fixing position. To that extent, a holding force is required to hold the locking claw in the position shown in FIG. 10 (non-operative position). Once this holding force is no longer present (e.g. because the freight item has passed the locking claw), the locking claw swivels back into its initial position (cf. FIG. 7).

For the purpose of anchoring the locking claw 12 permanently in the non-operative position, the ramp portions 44a, 44b each have recesses 49, which engage in extensions 29 present on the frame 20.

The rotary axle 46, likewise, has spring elements. The latter bias the second locking element 40, in the fixing position, into a blocking position (cf. FIG. 7). In the non-operative position (cf. FIG. 10), these spring elements act in such a way that the recesses 49 engage securely in the extensions 29. In order to attain the fixed non-operative position, it is necessary for the locking claw to be pressed down to such an extent that it assume a position that is below the non-operative position. This can be ensured, for example, by a manual pressure being exerted upon the locking claw 12. An item of freight travelling over the locking claw is usually not sufficient to ensure that the extensions 29 latch into the recesses 49. Since the second locking lug 41 is connected to the ramp portions 44a, 44b in a rotationally fixed manner, the fixing by means of the extensions 29 and the recesses 49 can be released by pressing in the second locking lug 41. The locking lug then slides back into the fixing position.

Figure 3:
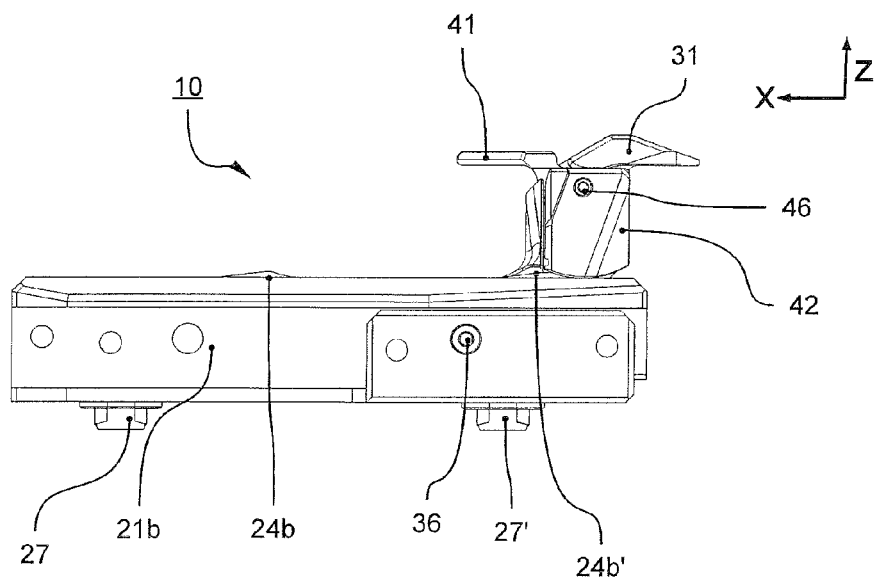
FIG. 3 shows a side view of the fastening device from FIG. 1.
Figure 6:
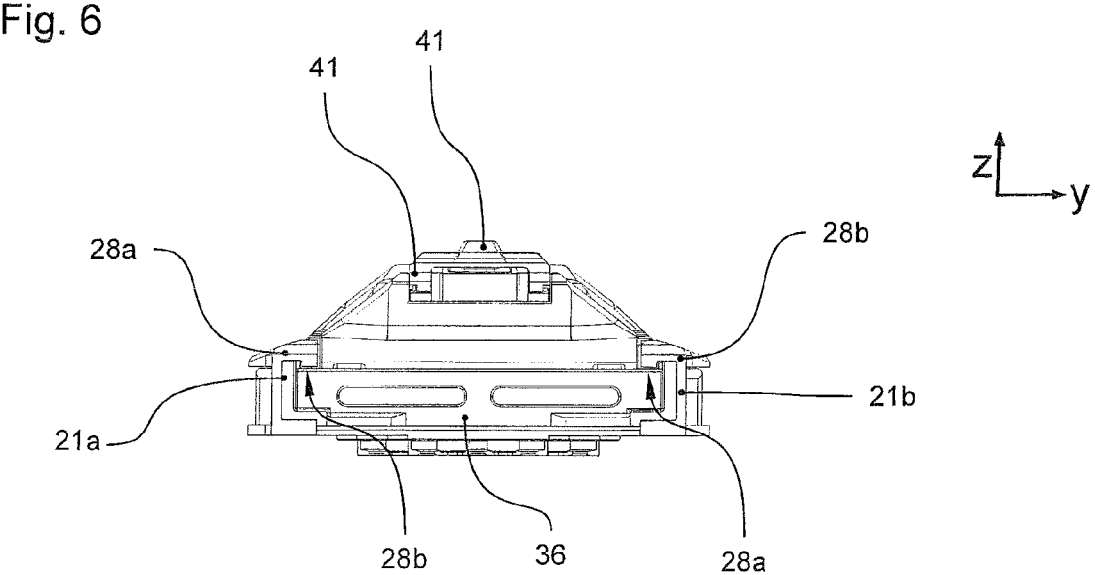
FIG. 6 shows a front view of the fastening device from FIG. 1.

FIG. 6 illustrates the design of the first rail 21a and of the second rail 21b. Thus, in cross-section, these rails constitute a U profile, the upper limbs being constituted by the first upper guide 28a (first limb 21a) and second upper guide 28b (second rail 21b). The main axle stop 38 from FIG. 11 uses these upper guides 28a, 28b as a counter-stop. It can be seen from FIG. 6 that the guides constituted by the rails 21a, 21b extend over the entire length of the frame 20 and the latter receive the main axle 36. In one embodiment of the present invention, the locking claw 12 can be displaced within this guide of the rails 21a, 21b. Thus, FIG. 1 shows the locking claw 12 in a first position, and FIG. 2 shows the locking claw 12 in a second position. The main axle 36 includes pins that latch in the rails 21a, 21b. For this purpose, these pins are biased by means of further spring elements, such that a first pin is pressed against the first rail 21a and a second pin is pressed against the second rail 21b, or into the bores provided there. The actuating elements 51a, 51b (cf. FIG. 2) enable the pins to be guided out of their latching position and thus to unlock the locking claw 12 in such a way that the latter can be displaced along the longitudinal axis X. Corresponding to the first and the second position of the locking claw 12, the frame 20 has the extensions 24a, 24a', 24b, 24b' (cf. FIGS. 2 and 3). Furthermore, further frame recesses 25a, 25b can be provided.

Figure 4:
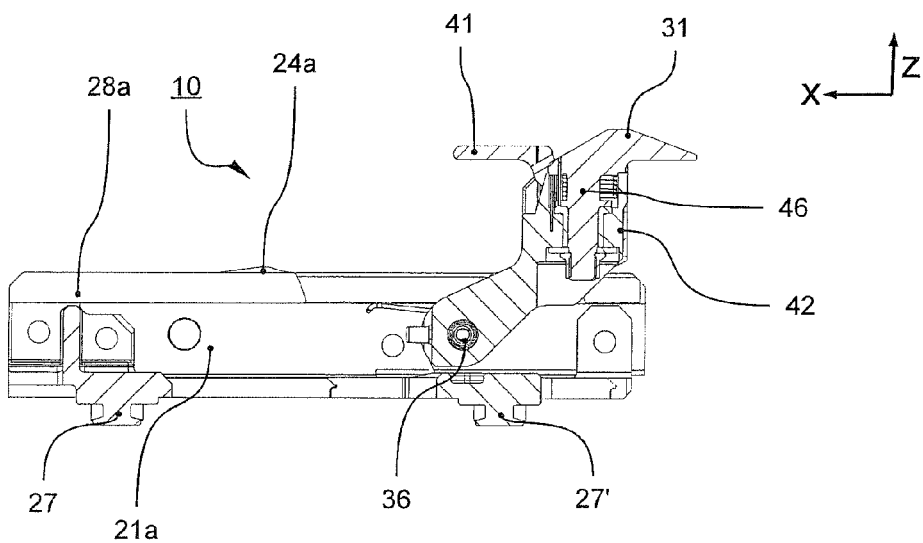
FIG. 4 shows a longitudinal section through the fastening device from FIG. 1, wherein the locking claw is in a fixing position.
Figure 5:
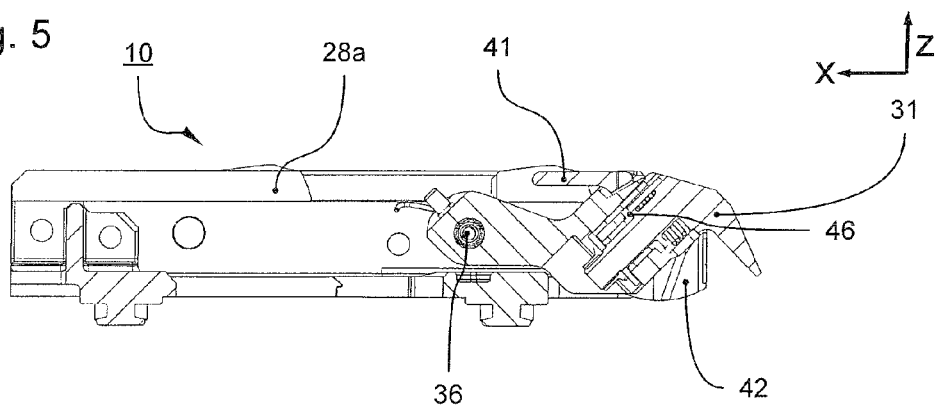
FIG. 5 shows a longitudinal section through the fastening device from FIG. 1, wherein the locking claw is in a non-operative position.

FIGS. 4 and 5 illustrate the structure of the locking claw 12 in greater detail. Thus, in the exemplary embodiment described, the first locking lug 41 is a rotary lug.

Figure 12:
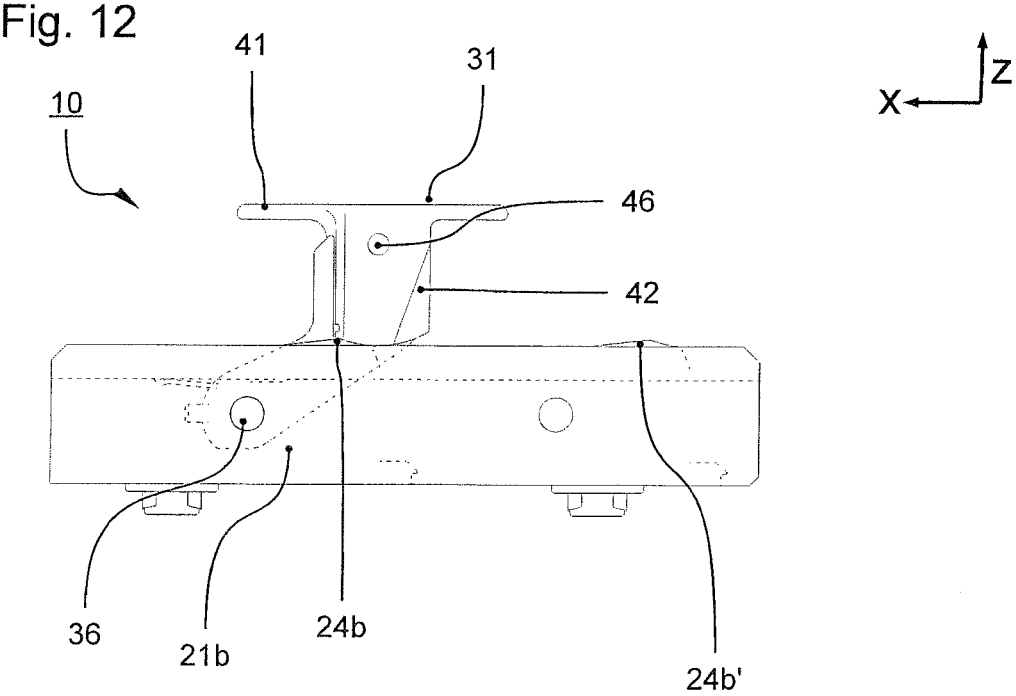
FIG. 12 shows a side view of a further fastening device.

FIG. 12 illustrates that the concept that is essential for the invention can also be realized in differing variations. Thus, FIG. 12 shows a fastening device 10 wherein the first locking lug 31 and the second locking lug 41 are both disposed on the second locking element 40. In the side view shown, the second locking element 40 has a T shape, and constitutes the already described T profile, the locking lugs 31, 41 being integrally connected to the ramp portions 44a, 44b and projecting over the latter in the longitudinal direction X.

LIST OF REFERENCES 10 fastening device
12 locking claw
20 frame
21a, 21b rail
23, 23' strut
24a, 24a', 24b, 24b' extension
25a, 25b frame recess
27, 27' anchoring rail
28a, 28b upper guide
29 extension
30 first locking element
31 first locking lug
33 first stop
36 main axle
37 main axle extension
38 main axle stop
40 second locking element
41 second locking lug
43 stop
44a, 44b ramp portion
46 rotary axle
49 recess
51a, 51b actuating element

What is claimed is:

1. Fastening device for at least partially securing a first and a second freight item, comprising:
    a frame,
    a locking claw, having a first locking lug and a second locking lug that, for the purpose of encompassing and holding partial portions of the freight items, are aligned along a longitudinal direction (X) of the fastening device,
    the locking claw being pivotally fastened to the frame in such a way that the locking claw can be swivelled out of a fixing position, for securing the freight items, into a non-operative position, and
    the locking claw including at least one ramp portion and being realized in such a way that the locking claw can be swivelled out of the fixing position and into the non-operative position by a freight item approaching in the transverse direction (Y).

2. Fastening device according to claim 1, wherein the locking claw comprises a first locking element and a second locking element having at least one locking lug, the first locking element being pivotally connected to the second locking element in such a way that the second locking element, in the fixing position, can be brought into a blocking position in which the second locking element supports the locking claw relative to the frame.

3. Fastening device according to claim 1, further including, at least one spring element, which biases the locking claw into the fixing position and/or biases the second locking element into the blocking position relative to the first locking element.

4. Fastening device according to any one of the preceding claims, in particular according to claim 2, wherein the second locking element comprises at least one latch, which is disposed in such a way that the latch, in the non-operative position, can be brought into engagement with a portion of the frame in order to hold the locking claw in the non-operative position.

5. Fastening device according to claim 1, wherein for the purpose of supporting the locking claw, the second locking element comprises at least one support portion that is convex in the longitudinal direction (X).

6. Fastening device according to claim 5, wherein the frame includes at least one concave receiver, in particular having an extension, in order to receive the support portion and to block the locking claw in the fixing position.

7. Fastening device according to claim 1 wherein the at least one ramp portion is realized and disposed in such a way that the approaching freight item induces a rotational motion, in particular of the second locking element, about a rotation axle that connects the first locking element and the second locking element.

8. Fastening device according to claim 1 wherein the frame comprises at least one first rail and one second rail, in which rails the locking claw is mounted in a rotationally movable manner, the rails comprising a guide and comprising at least one latching device in which the locking claw, in particular a main axle thereof, is disposed so as to be displaceable in the longitudinal direction (X).

9. Fastening device according to claim 1, wherein the main axle comprises a sleeve having at least one pin, which is disposed so as to be movable in the latter and which, for the purpose of fixing the locking claw, engages in a recess disposed on the frame.

10. Fastening device according to claim 1, wherein the main axis (36) comprises two pins and comprises at least one spring element that is operatively connected to the pins in such a way that the pins latch into recesses disposed on the frame (20).

11. Fastening device according to claim 1, wherein the second locking element, in cross-section, has a substantially trapezoidal shape, in order to support the locking claw on the frame.

12. Fastening device according to claim 1, including at least two ramp portions, which are disposed on either side of the locking claw.

13. Fastening device according to claim 1, wherein the locking claw comprises a first stop, which, in the fixing position, is realized so as to correspond to a second stop on the frame, in particular to the guide, in such a way that a lifting force acting upon the locking claw in the fixing position can be transferred into the frame.

14. Fastening device for at least partially securing a first and a second freight item, comprising:
   a frame,
   a locking claw, having a first locking lug and a second locking lug that, for the purpose of encompassing and holding partial portions of the freight items, are aligned along a longitudinal direction (X) of the fastening device,
   the locking claw being pivotally fastened to the frame in such a way that the locking claw can be swivelled out of a fixing position, for securing the freight items, into a non-operative position,
   the locking claw including at least one ramp portion and being realized in such a way that the locking claw can be swivelled out of the fixing position and into the non-operative position by a freight item approaching in the transverse direction (Y), wherein the locking claw comprises a first locking element and a second locking element having at least one locking lug, the first locking element being pivotally connected to the second locking element via a rotary axle in such a way that the second locking element being in a blocking position in which the second locking element supports the locking claw relative to the frame can be rotated around the rotary axle relative to the first locking element.

* * * * *